(12) United States Patent
Yang et al.

(10) Patent No.: US 11,761,844 B2
(45) Date of Patent: Sep. 19, 2023

(54) LEAK DETECTION SENSOR AND LEAK DETECTION SYSTEM USING SAME

(71) Applicant: Delta Electronics, Inc., Taoyuan (TW)

(72) Inventors: Ming-Tang Yang, Taoyuan (TW); Yen-Hsuan Wang, Taoyuan (TW); Yu-Hao Shen, Taoyuan (TW); Wei-Chung Chen, Taoyuan (TW); Kun-Cheng Mao, Taoyuan (TW); Jhih-Hao Chen, Taoyuan (TW); Sheng-Chun Fang, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 35 days.

(21) Appl. No.: 17/545,835

(22) Filed: Dec. 8, 2021

(65) Prior Publication Data

US 2023/0133191 A1 May 4, 2023

(30) Foreign Application Priority Data

Nov. 3, 2021 (CN) .......................... 202111294107.8

(51) Int. Cl.
*G01M 3/18* (2006.01)

(52) U.S. Cl.
CPC ..................................... *G01M 3/18* (2013.01)

(58) Field of Classification Search
CPC ............ G01M 3/00; G01M 3/16; G01M 3/18; G01M 3/40
See application file for complete search history.

(56) References Cited

U.S. PATENT DOCUMENTS

| 7,948,388 | B2 | 5/2011 | McGinty et al. |
| 2005/0092070 | A1 | 5/2005 | Bhatti |
| 2012/0278018 | A1* | 11/2012 | Hastreiter ............... G01M 3/18 702/65 |

(Continued)

FOREIGN PATENT DOCUMENTS

| CN | 203893984 U | 10/2014 |
| CN | 209729591 U | 12/2019 |

(Continued)

*Primary Examiner* — Nguyen Q. Ha
(74) *Attorney, Agent, or Firm* — KIRTON McCONKIE; Evan R. Witt

(57) ABSTRACT

A leak detection sensor is disclosed for detecting a leaking liquid spilled from an adapter-coupling position, and includes a first conductive layer, an insulator and a second conductive layer. The first conductive layer includes a first through hole. The adapter-coupling position is located adjacent to the first through hole. The insulator includes a second through hole. The second conductive layer is connected to the first conductive layer through the insulator, and includes a conducting surface in fluid communication with the adapter-coupling position through the second through hole and the first through hole. The first conductive layer and the second conductive layer are insulated from each other through the insulator. When the leaking liquid is spilled into the first through hole and the second through hole, and contacts the conducting surface, the second conductive layer is conducted to the first conductive layer to form a conducting-resistance value.

9 Claims, 9 Drawing Sheets

(56) References Cited

U.S. PATENT DOCUMENTS

| | | | | |
|---|---|---|---|---|
| 2013/0305815 A1* | 11/2013 | Yu | ......................... | G01M 3/165 |
| | | | | 73/40 |
| 2015/0362397 A1* | 12/2015 | Yu | ........................... | G01M 3/18 |
| | | | | 73/40 |
| 2019/0128769 A1 | 5/2019 | Lim et al. | | |
| 2020/0333276 A1* | 10/2020 | Ikoma | .................... | G01M 3/16 |

FOREIGN PATENT DOCUMENTS

| | | | | | |
|---|---|---|---|---|---|
| KR | 20130021039 A | * | 3/2013 | .............. | G01M 3/18 |
| KR | 20140007156 A | * | 1/2014 | .............. | G01M 3/16 |
| KR | 20160065460 A | * | 6/2016 | .............. | G01M 3/18 |
| KR | 20180050879 A | * | 5/2018 | .............. | G01M 3/40 |
| TW | I428579 B | | 3/2014 | | |
| TW | M604539 U | | 11/2020 | | |
| WO | 2019123750 A1 | | 6/2019 | | |

* cited by examiner

LEAK DETECTION SENSOR AND LEAK DETECTION SYSTEM USING SAME

FIELD OF THE INVENTION

The present disclosure relates to a leak detection sensor, and more particularly to a leak detection sensor at an adapter-coupling position in a liquid pipeline and a leak detection system using the same, to realize the leak detection of a leaking liquid through a detection mode of conducting-resistance.

BACKGROUND OF THE INVENTION

The leak detection of liquid pipeline has been widely used in large pipelines, such as tap water pipelines, liquid chemicals and petroleum pipelines. In the process of transporting tap water, liquid chemicals and petroleum, the adapter-coupling positions of equipment, pipelines, valves and flanges are under pressure for a long time. Under this environment, a leaking liquid is generated easily, and the personal injury or the property loss is caused. A conventional leak detection method is usually to determine whether there is a leak in the pipeline by detecting whether the pressure change in the pipeline is abnormal. However, this detection method is only suitable for long-length, large-diameter conveying pipelines, and it is impossible to accurately determine the location of leakage. In addition, it needs the assistance of instruments to determine the abnormality, so as to be able to accurately determine the leakage.

Therefore, there is a need of providing a leak detection sensor and a leak detection system using the same to realize the leak detection of a leaking liquid through a detection mode of conducting-resistance instead of the conventional leak detection method of detecting the inner pressure change in the pipeline. Thus, the sensitivity of the sensing element triggered by the leaking liquid is improved. In addition, the leak detection sensor and the leak detection system are applicable to more complicated circuits, and divided in the form of segments to cover a plurality of adapter-coupling positions where a leaking liquid may be generated. When any one of the segments detects the leaking liquid, it is determined accurately therethrough. The drawbacks encountered by the prior arts are obviated.

SUMMARY OF THE INVENTION

An object of the present disclosure is to provide a leak detection sensor and a leak detection system using the same. By utilizing a detection mode of conducting-resistance to realize the leak detection of a leaking liquid, the conventional leak detection method of detecting the inner pressure change in the pipeline is replaced. The sensitivity of the sensing element triggered by the leaking liquid is improved. In addition, the leak detection sensor and the leak detection system are applicable to more complicated circuits, and divided in the form of segments to cover a plurality of adapter-coupling positions where a leaking liquid may be generated. When any one of the segments detects the leaking liquid, it is determined accurately therethrough.

Another object of the present disclosure is to provide a leak detection sensor and a leak detection system using the same. The leak detection sensor is designed with a sandwiched structure, which includes an upper conductive layer and a lower conductive layer disposed on top and bottom, respectively, and a middle insulator disposed in the middle. The upper conductive layer and the lower conductive layer are connected to the electricity, respectively. Since each of the upper conductive layer and the middle insulator is designed to include a plurality of through holes, the leaking liquid is allowed to flow to the lower conductive layer. When the leaking liquid is passed through the through holes, a conducting-resistance is formed between the upper conductive layer and the lower conductive layer, and the sensing element is triggered. Compared with the conventional leak detection method of detecting the inner pressure change in the pipeline, the leak detection sensor of the present disclosure has a sensitive sensing ability. When there is a leaking liquid generated even with a small amount of leakage, the sensing element is triggered for the leak detection immediately. The location of leakage is found for performing the follow-up treatments. It prevents a large amount of leaking liquid from generating and causing personal injury or property loss.

A further object of the present disclosure is to provide a leak detection sensor and a leak detection system using the same. The design of the sandwiched structure is applicable in a wide range. According to the different environments of the adapter-coupling positions, the leak detection sensor is laid on a flat surface or set in a double clamp arrangement. When the leak detection sensor is applied to monitor a plurality of adapter-coupling positions, by utilizing the regression correction of the conducting-resistance measured, the leaking location in the adapter-coupling positions is determined. The configuration of the leak detection sensor in the complicated adapter-coupling pipeline is simplified, and the leak detection applications are integrated efficiently.

In accordance with an aspect of the present disclosure, a leak detection sensor is provided for detecting a leaking liquid spilled from an adapter-coupling position and includes a first conductive layer, an insulator and a second conductive layer. The first conductive layer includes a first surface, a second surface and at least one first through hole. The first surface and the second surface are opposite to each other, and the at least one first through hole is passed through the first surface and the second surface. The adapter-coupling position is located outside the first surface and the at least one first through hole is disposed adjacent to the adapter-coupling position. The insulator is disposed on the second surface and includes at least one second through hole. The at least one first through hole and the at least one second through hole are in fluid communication with each other. The second conductive layer is connected to the second surface of the first conductive layer through the insulator, and includes at least one conducting surface in fluid communication with the adapter-coupling position through the at least one second through hole and the at least one first through hole. The first conductive layer and the second conductive layer are insulated from each other through the insulator. When the leaking liquid is spilled into the at least one first through hole and the at least one second through hole, and in contact with the at least one conducting surface, the second conductive layer is conducted to the first conductive layer to form a conducting-resistance value.

In an embodiment, the leak detection sensor further includes a first wire and a second wire electrically connected to the first conductive layer and the second conductive layer, respectively.

In an embodiment, the leak detection sensor further includes a sensing element electrically connected to the first conductive layer and the second conductive layer through the first wire and the second wire, respectively, wherein when the leaking liquid is spilled into the at least one first through hole and the at least one second through hole, and in contact with the at least one conducting surface, the conducting-resistance value is measured by the sensing element.

In an embodiment, the first conductive layer and the second conductive layer have a potential difference.

In an embodiment, the at least one first through hole includes a plurality of first through holes, the at least one second through hole includes a plurality of second through holes, and the plurality of first through holes are spatially corresponding to the plurality of second through holes, respectively, and disposed adjacent to an outer periphery of the adapter-coupling position.

In accordance with another aspect of the present disclosure, a leak detection system is provided and includes at least one adapter and a leak detection sensor. The at least one adapter is connected to a pipeline to form at least one adapter-coupling position. The leak detection sensor is disposed adjacent to the at least one adapter-coupling position for detecting a leaking liquid spilled from the at least one adapter-coupling position. The leak detection sensor includes a first conductive layer, an insulator and a second conductive layer. The first conductive layer includes a first surface, a second surface and at least one first through hole. The first surface and the second surface are opposite to each other, and the at least one first through hole is passed through the first surface and the second surface. The at least one adapter-coupling position is located outside the first surface and the at least one first through hole is disposed adjacent to the at least one adapter-coupling position. The insulator is disposed on the second surface and includes at least one second through hole. The at least one first through hole and the at least one second through hole are in fluid communication with each other. The second conductive layer is connected to the second surface of the first conductive layer through the insulator, and includes at least one conducting surface in fluid communication with the at least one adapter-coupling position through the at least one second through hole and the at least one first through hole. The first conductive layer and the second conductive layer are insulated from each other through the insulator. When the leaking liquid is spilled into the at least one first through hole and the at least one second through hole, and in contact with the at least one conducting surface, the second conductive layer is conducted to the first conductive layer to form a conducting-resistance value.

In an embodiment, the leak detection sensor is disposed along the pipeline and attached to an outer periphery of the pipeline, and the at least one adapter is led out from the outer periphery of the pipeline.

In an embodiment, the first conductive layer includes at least one first opening, the insulator includes at least one second opening, and the second conductive layer includes at least one third opening, wherein the at least one first opening, the at least one second opening and the at least one third opening are spatially corresponding to the at least one adapter, and the at least one adapter passes through the at least one third opening, the at least one second opening and the at least one first opening in sequence so that the at least one adapter-coupling position is located outside the first surface, and the at least one first through hole and the at least one adapter-coupling position are disposed adjacent to each other.

In an embodiment, the pipeline includes at least one positioning column disposed adjacent to the at least one adapter, wherein the first conductive layer includes at least one first alignment aperture, the insulator includes at least one second alignment aperture, and the second conductive layer includes at least one third alignment aperture, wherein the at least one first alignment aperture, the at least one second alignment aperture, and the at least one third alignment aperture are spatially corresponding to each other and in communication with each other, wherein the at least one positioning column passes through the at least one third alignment aperture, the at least one second alignment aperture and the at least one first alignment aperture in sequence, so that the second conductive layer, the insulator and the first conductive layer are stacked on the pipeline.

In an embodiment, the pipeline includes at least one fastening element and at least one fastening aperture spatially corresponding to each other, wherein the first conductive layer includes at least one first clamped portion, the insulator includes at least one second clamped portion, and the third conductive layer includes at least one third clamped portion, and the at least one first clamped portion, the at least one second clamped portion and the at least one third clamped portion are spatially corresponding to the at least one fastening aperture, wherein when the at least one fastening element is engaged with the at least one fastening aperture, the at least one first clamped portion, the at least one second clamped portion and the at least one third clamped portion are clamped, so that the second conductive layer, the insulator and the first conductive layer are stacked and fastened on the pipeline.

In an embodiment, the pipeline is extended along a direction and has a first end and a second end opposite to each other, wherein the leak detection sensor further includes a first wire and a second wire disposed on the first end of the pipeline, and electrically connected to the first conductive layer and the second conductive layer, respectively.

In an embodiment, the at least one adapter includes a first adapter and a second adapter disposed along the direction, wherein the distance from the second adapter to the first end is greater than the distance from the first adapter to the first end, and the conducting-resistance value corresponding to the leaking liquid spilled from the second adapter is greater than the conducing-resistance value corresponding to the leaking liquid spilled from the first adapter.

In an embodiment, the at least one adapter is led out from one end of the pipeline, and the leak detection sensor is arranged along the pipeline and covers the at least one adapter.

In an embodiment, the first surface of the first conductive layer covers the at least one adapter-coupling position, the insulator covers the second surface of the first conductive layer, and the second conductive layer covers the insulator.

In an embodiment, the leak detection system further includes an outer sleeve detachably disposed on the pipeline and covering the leak detection sensor and the at least one adapter.

In an embodiment, the outer sleeve includes at least one positioning column disposed on an inner wall of the outer sleeve, wherein the first conductive layer includes at least one first alignment aperture, the insulator includes at least one second alignment aperture, and the second conductive layer includes at least one third alignment aperture, wherein the at least one first alignment aperture, the at least one second alignment aperture, and the at least one third alignment aperture are spatially corresponding to each other and in communication with each other, wherein when the outer sleeve covers the leak detection sensor and the at least one adapter, the at least one positioning column is passed through the at least one third alignment aperture, the at least one second alignment aperture and the at least one first alignment aperture in sequence.

In an embodiment, the leak detection sensor further includes a sensing element electrically connected to the first conductive layer and the second conductive layer, respectively, wherein when the leaking liquid is spilled into the at least one first through hole and the at least one second through hole, and in contact with the at least one conducting surface, the conducting-resistance value is measured by the sensing element.

In an embodiment, the first conductive layer and the second conductive layer are electrically connected to different potentials, respectively.

BRIEF DESCRIPTION OF THE DRAWINGS

The above contents of the present disclosure will become more readily apparent to those ordinarily skilled in the art after reviewing the following detailed description and accompanying drawings, in which.

DETAILED DESCRIPTION OF THE PREFERRED EMBODIMENT

Figure 1:
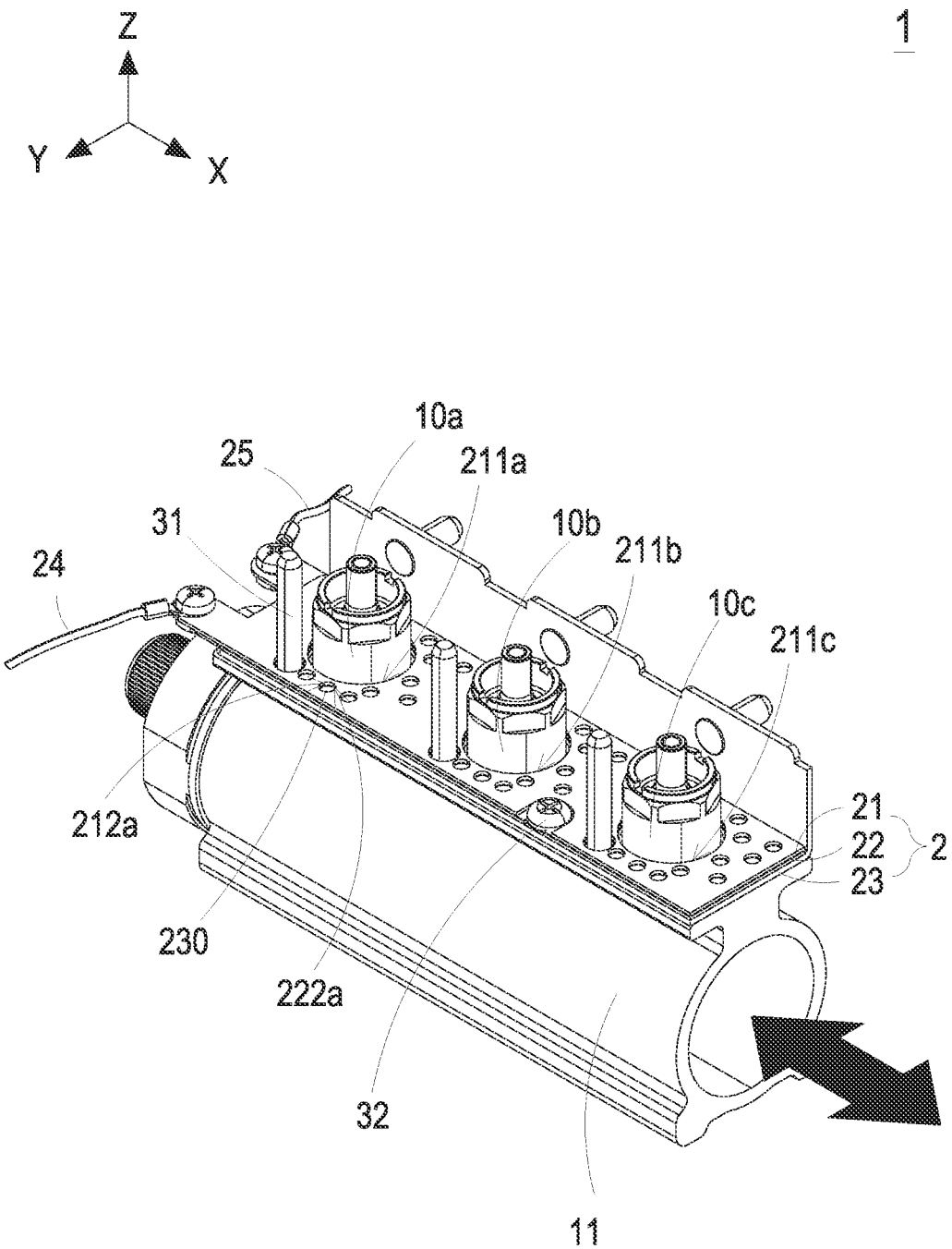
FIG. 1 is a perspective view illustrating a leak detection system according to a first embodiment of the present disclosure.

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed. Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. When an element is referred to as being "connected," or "coupled," to another element, it can be directly connected or coupled to the other element or intervening elements may be present. Although the wide numerical ranges and parameters of the present disclosure are approximations, numerical values are set forth in the specific examples as precisely as possible. In addition, although the "first," "second," "third," and the like terms in the claims be used to describe the various elements can be appreciated, these elements should not be limited by these terms, and these elements are described in the respective embodiments are used to express the different reference numerals, these terms are only used to distinguish one element from another element. For example, a first element could be termed a second element, and, similarly, a second element could be termed a first element, without departing from the scope of example embodiments.

Figure 2:
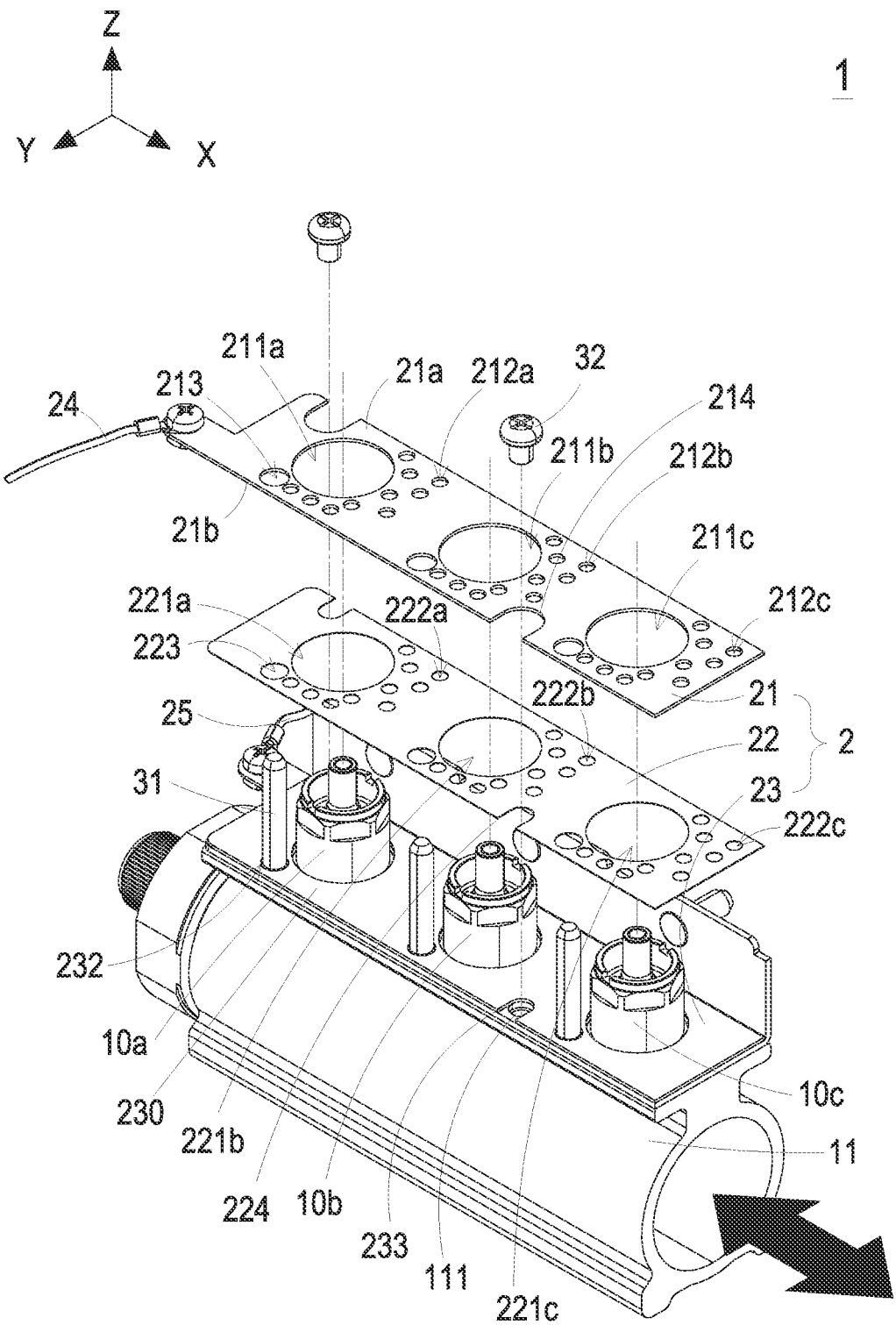
FIG. 2 is an exploded view illustrating the leak detection system according to the first embodiment of the present disclosure.
Figure 3:
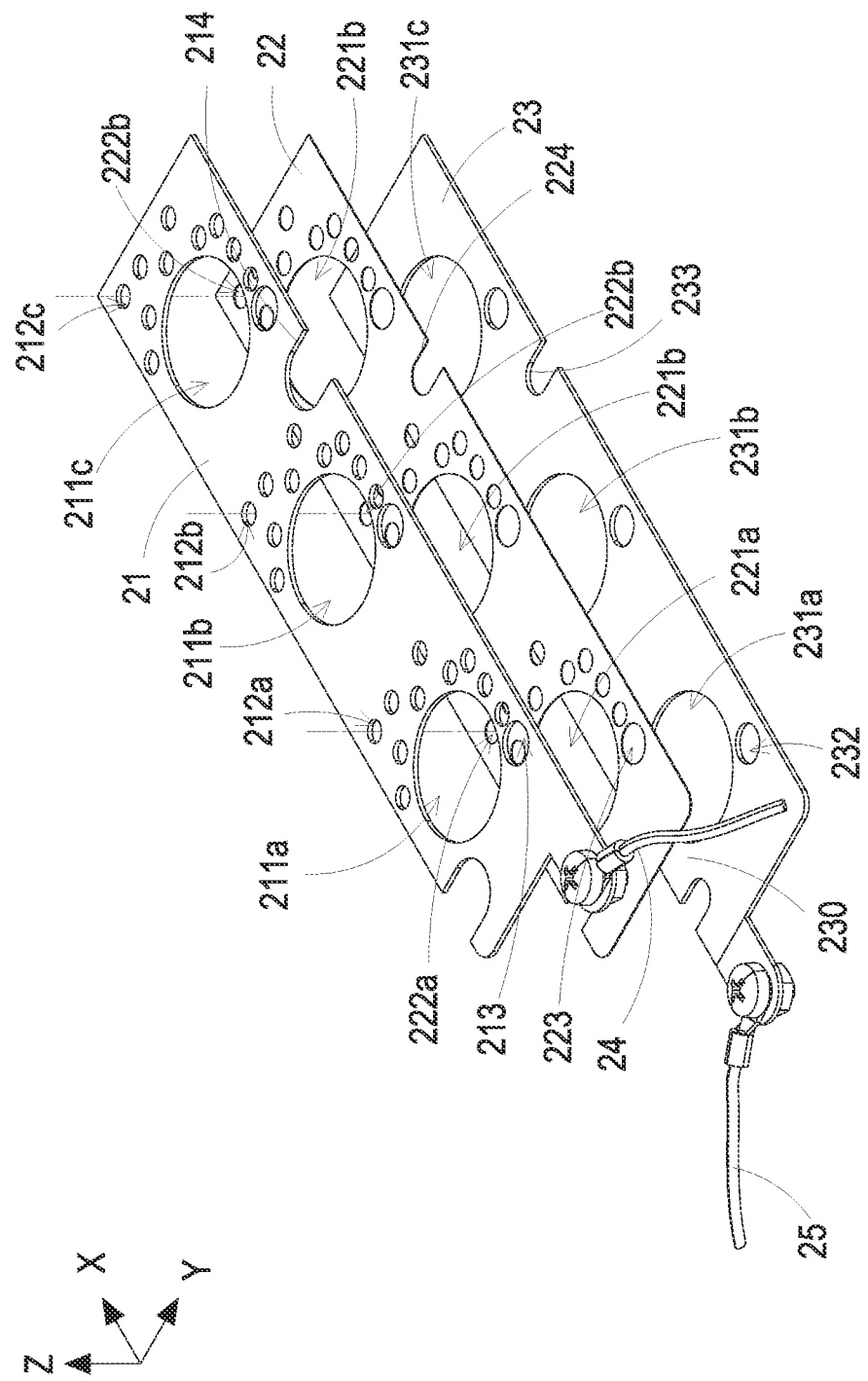
FIG. 3 is an exploded view illustrating the leak detection sensor according to the first embodiment of the present disclosure.
Figure 4A:
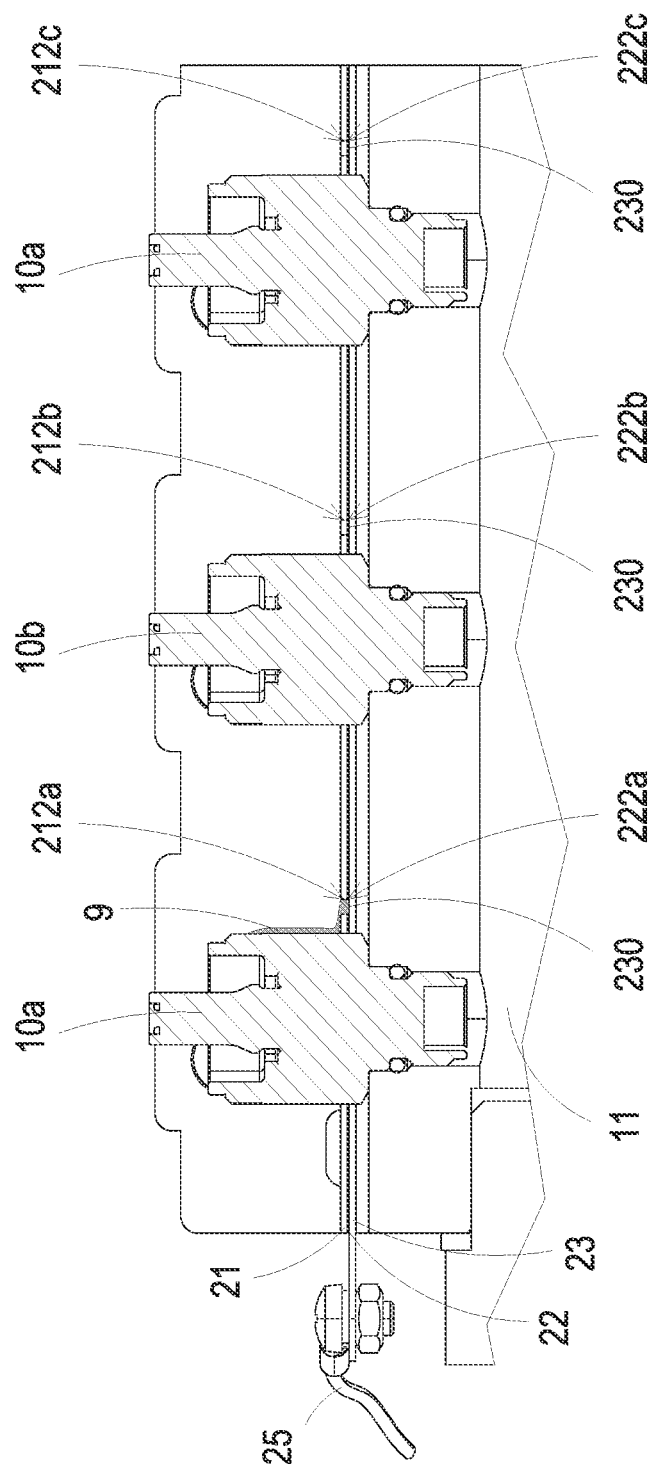
FIG. 4A is a cross-sectional view illustrating an example of a leaking liquid detected in the leak detection system according to the first embodiment of the present disclosure.
Figure 4B:
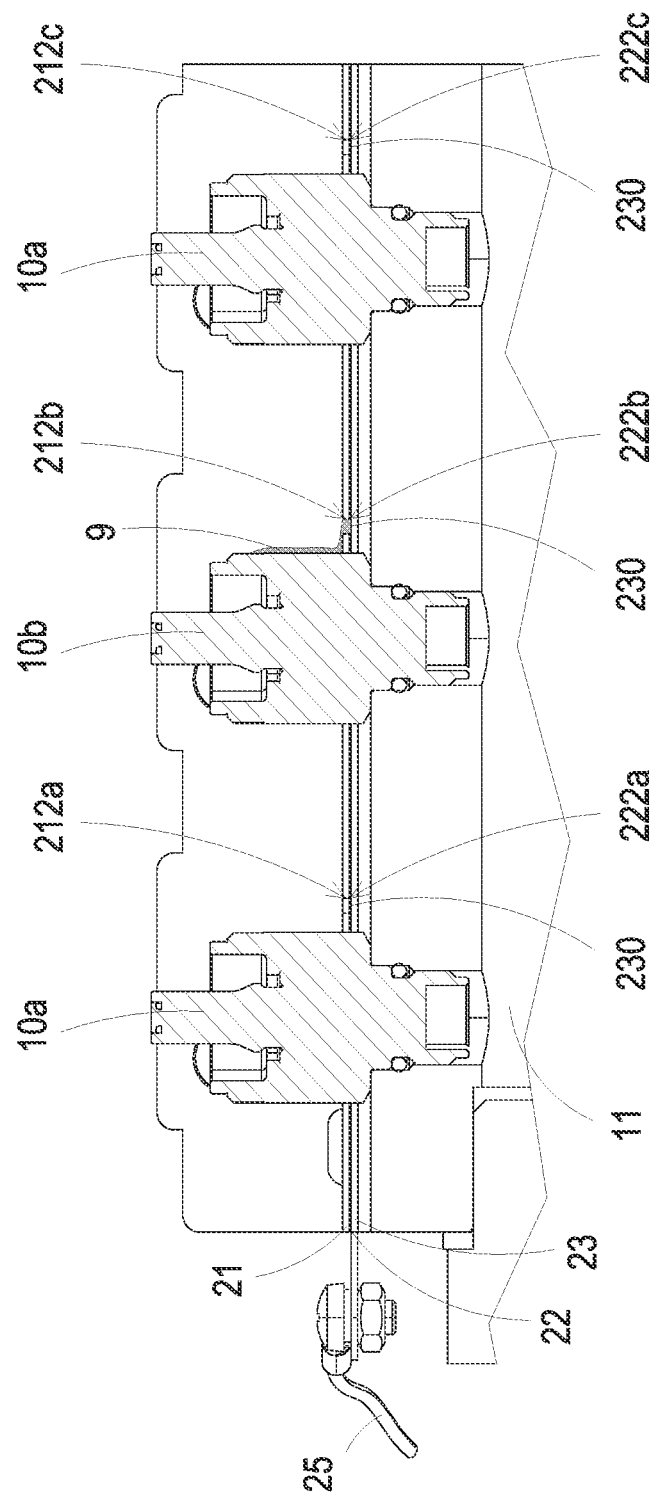
FIG. 4B is a cross-sectional view illustrating another example of a leaking liquid detected in the leak detection system according to the first embodiment of the present disclosure.

FIG. 1 is a perspective view illustrating a leak detection system according to a first embodiment of the present disclosure. FIG. 2 is an exploded view illustrating the leak detection system according to the first embodiment of the present disclosure. FIG. 3 is an exploded view illustrating the leak detection sensor according to the first embodiment of the present disclosure. FIGS. 4A and 4B are cross-sectional views illustrating examples of a leaking liquid detected in the leak detection system according to the first embodiment of the present disclosure. In the embodiment, the leak detection system 1 includes at least one adapter and a leak detection sensor 2. The leak detection sensor 2 is disposed along a pipeline 11. Preferably but not exclusively, the leak detection sensor 2 is laid horizontally along the X-axis direction, and attached to an outer periphery of the pipeline 11. At least one adapter is led out from the outer periphery of the pipeline 11. Preferably but not exclusively, the at least one adapter is led along the Z-axis direction. Notably, in the embodiment, the at least one adapter is, for example, any one of the first adapter 10a, the second adapter 10b and the third adapter 10c. The number of the adapters corresponding to the leak detection sensor 2 is adjustable according to the practical requirements, and the present disclosure is not limited thereto. In the embodiment, the first adapter 10a, the second adapter 10b and the third adapter 10c are connected to the pipeline 11, respectively, so as to form three adapter-coupling positions. The leak detection sensor 2 is disposed adjacent to the three adapter-coupling positions formed by the first adapter 10a, the second adapter 10b and the third adapter 10c, and is configured to detect a leaking liquid 9 spilled from any adapter. In the embodiment, the leak detection sensor 2 includes a first conductive layer 21, an insulator 22 and a second conductive layer 23. The first conductive layer 21 includes a first surface 21a and a second surface 21b opposite to each other. Corresponding to the first adapter 10a, the first conductive layer 21 includes a first opening 211a and at least one first through hole 212a passed through the first surface 21*a* and the second surface 21*b*. The first adapter 10*a* passes through the first opening 211*a*, the adapter-coupling position formed by the first adapter 10*a* is located outside the first surface 21*a* of the first conductive layer 21, and the at least one first through hole 212*a* is disposed adjacent to the adapter-coupling position formed by the first adapter 10*a*. The insulator 22 is disposed on the second surface 21*b* of the first conductive layer 21, spatially corresponding to the first adapter 10*a*, and includes a second opening 221*a* and at least one second through hole 222*a*. The first adapter 10*a* passes through the second opening 221*a*. The at least one second through hole 222*a* and the corresponding at least one first through hole 212*a* are in fluid communication with each other. The second conductive layer 23 is connected to the second surface 21*b* of the first conductive layer 21 through the insulator 22, and includes a third opening 231*a* and at least one conducting surface 230. The first adapter 10*a* is passes through the third opening 231*a*. Moreover, the at least one conducting surface 230 is in fluid communication with the adapter-coupling position, formed by the first adapter 10*a* connected to the pipeline 11, through the corresponding at least one second through hole 222*a* and the corresponding at least one first through hole 212*a*. In other embodiments, the second conductive layer 23 further includes an aperture (not shown) formed on conducting surface 230 and spatially corresponding to the second through hole 222*a* and the first through hole 212*a*. That is, the conducting surface 230 is further extended to an inner wall surface of the opening, and in fluid communication with the adapter-coupling position, formed by the first adapter 10*a* connected to the pipeline 11, through the corresponding second through hole 222*a* and the corresponding first through hole 212. Certainly, the present disclosure is not limited thereto. Corresponding to the second adapter 10*b*, the first conductive layer 21 includes a first opening 211*b* and at least one first through hole 212*b* passed through the first surface 21*a* and the second surface 21*b*. The second adapter 10*b* passes through the first opening 211*b*, the adapter-coupling position formed by the second adapter 10*b* is located outside the first surface 21*a* of the first conductive layer 21, and the at least one first through hole 212*b* is disposed adjacent to the adapter-coupling position formed by the second adapter 10*b*. The insulator 22 is spatially corresponding to the second adapter 10*b* and includes a second opening 221*b* and at least one second through hole 222*b*. The second adapter 10*b* passes through the second opening 221*b*. The at least one second through hole 222*b* and the corresponding at least one first through hole 212*b* are in fluid communication with each other. The second adapter 10*b* passes through the third opening 231*b*. The at least one conducting surface 230 is in fluid communication with the adapter-coupling position, formed by the second adapter 10*b* connected to the pipeline 11, through the corresponding at least one second through hole 222*b* and the corresponding at least one first through hole 212*b*. In other embodiments, the second conductive layer 23 further includes an opening (not shown) formed on the conducting surface 230, and spatially corresponding to the second through hole 222*b* and the first through hole 212*b*. That is, the conducting surface 230 is further extended to an inner wall surface of the opening, and in fluid communication with the adapter-coupling position, formed by the second adapter 10*b* connected to the pipeline 11, through the corresponding second through hole 222*a* and the corresponding first through hole 212*a*. Certainly, the present disclosure is not limited thereto. Similarly, the third adapter 10*c* sequentially passes through the corresponding third opening 231*c* of the second conductive layer 23, the second opening 221*c* of the insulator 22, and the first opening 211*c* of the first conductive layer 21, so that the adapter-coupling position formed by the third adapter 10*c* connected to the pipeline 11 is located outside the first surface 21*a* and disposed adjacent to the corresponding first through hole 212*c*. It should be noted that any one of the first adapter 10*a*, the second adapter 10*b* and the third adapter 10*c* can be omitted, the number of the adapters is adjustable according to the practical requirements, and the present disclosure is not limited thereto. In addition, the number, the size and the arrangement of the at least one first through hole 212*a*, 212*b*, 212*c* and the corresponding at least one second through hole 222*a*, 222*b*, 222*c* are adjustable according to the practical requirements. Preferably but not exclusively, there are a plurality of through holes arranged around the outer periphery of the adapter-coupling position corresponding thereto. The present disclosure is not limited thereto.

In the embodiment, the first conductive layer 21 and the second conductive layer 23 are insulated from each other through the insulator 22. The leak detection sensor 2 further includes a first wire 24, a second wire 25 and a sensing element (not shown). Preferably but not exclusively, the first wire 24 and the second wire 25 are disposed at the first end 11*a* of the pipeline 11. The sensing element is electrically connected to the first conductive layer 21 and the second conductive layer 23 through the first wire 24 and the second wire 25, respectively. The first conductive layer 21 and the second conductive layer 23 are connected to the electricity, respectively. Preferably but not exclusively, the first conductive layer 21 and the second conductive layer 23 are electrically connected to different potentials, respectively. That is, the first conductive layer 21 and the second conductive layer 23 have a potential difference, so as to realize the leak detection of the leaking liquid 9. Taking the first adapter 10*a* as an example, when the leaking liquid 9 is spilled into the first through hole 212*a* and the second through hole 222*a* corresponding to the first adapter 10*a*, and in contact with the conducting surface 230, the conducting-resistance value formed between the second conductive layer 23 and the first conductive layer 21 is measured by the sensing element, as shown in FIG. 4A. Taking the second adapter 10*b* as an example, when the leaking liquid 9 is spilled into the first through hole 212*b* and the second through hole 222*b* corresponding to the second adapter 10*b* and in contact with the conducting surface 230, the conducting-resistance value formed between the second conductive layer 23 and the first conductive layer 21 is measured by the sensing element, as shown in FIG. 4B. In other words, the leak detection sensor 2 is designed with a sandwiched structure. The upper first conductive layer 21 and the lower second conductive layer 23 are conductors, and the insulator 22 is disposed therebetween. The first conductive layer 21 and the second conductive layer 23 are connected to the electricity, respectively, in advance. Since the upper first conductive layer 23 and the middle insulator 22 are designed to include a plurality of through holes, the leaking liquid 9 is allowed to flow to the conducting surface 230 of the second conductive layer 23, so that the conducting-resistance value is formed between the first conductive layer 21 and the second conductive layer 23, and the sensing element is triggered. Compared with the conventional leak detection method of detecting the inner pressure change in the pipeline, the leak detection sensor 2 of the present disclosure has a sensitive sensing ability. When there is a leaking liquid 9 generated even with a small amount of leakage, the sensing element is triggered for the leak detection immediately. The location of leakage is found for performing the follow-up treatments. It prevents a large amount of leaking liquid 9 from generating and causing personal injury or property loss.

Notably, in the embodiment, the pipeline 11 is extended for example along the X-axis direction, and the first adapter 10a and the second adapter 10b are also arranged along the X-axis direction. Under the condition that the first conductive layer 21 and the second conductive layer 23 are connected to the electricity, respectively, the distance from the second adaptor 10b to the first end 11a is greater than the distance from the first adaptor 10a to the first end 11a, and the conducting-resistance value corresponding to the leaking liquid 9 spilled from the second adapter 10b is greater than the conducting-resistance value corresponding to the leaking liquid 9 spilled from the first adapter 10a. Similarly, the conducting-resistance value corresponding to the leaking liquid 9 spilled from the third adapter 10c is greater than the conducting-resistance value corresponding to the leaking liquid 9 spilled from the second adapter 10b.

Figure 5:
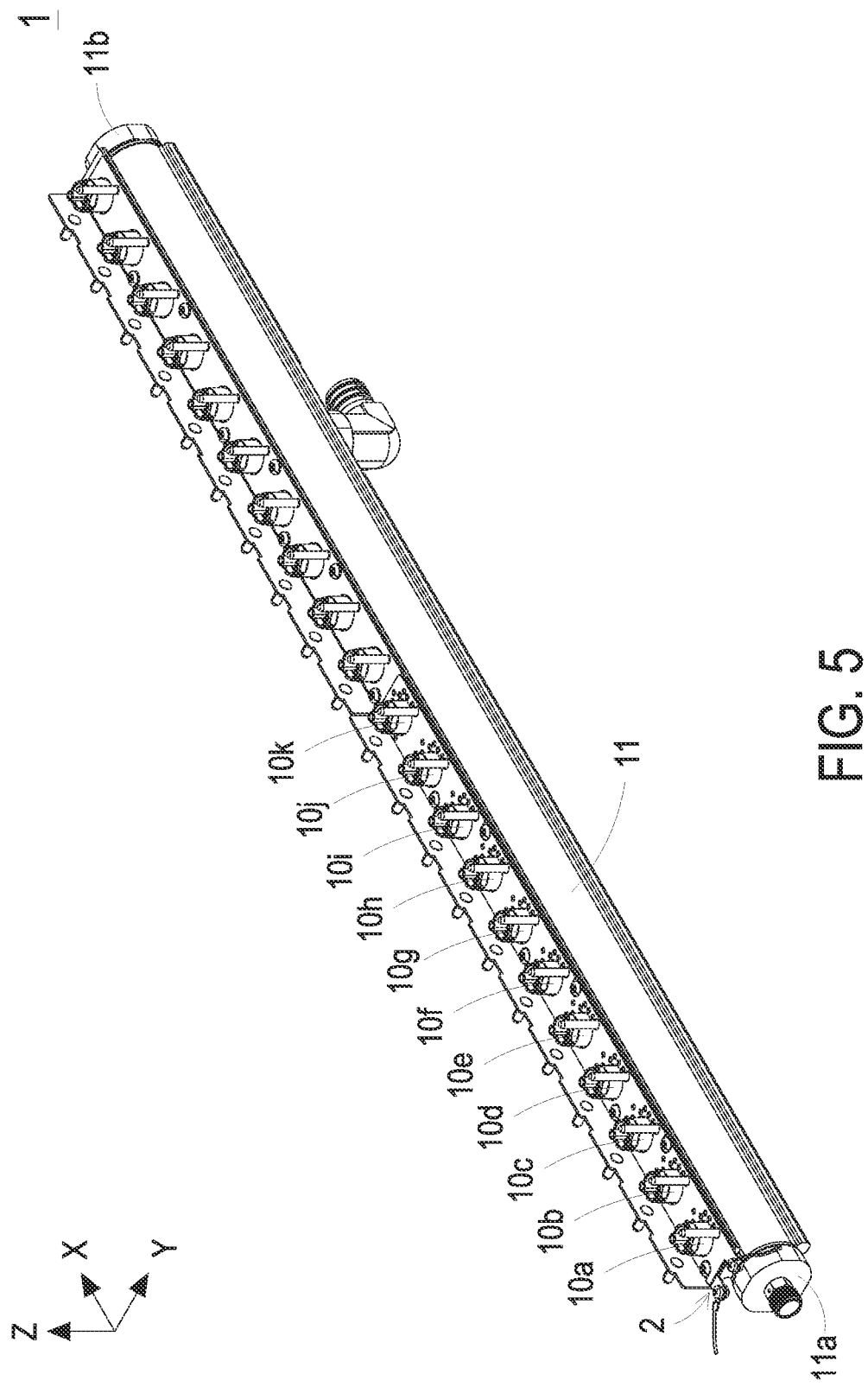
FIG. 5 is a perspective view illustrating an exemplary application of the leak detection system according to the first embodiment of the present disclosure.

FIG. 5 is a perspective view illustrating an exemplary application of the leak detection system according to the first embodiment of the present disclosure. Please refer to FIGS. 1 to 5. Preferably but not exclusively, in the embodiment, a plurality of adapters 10a, 10b, 10c, 10d, 10e, 10f, 10g, 10h, 10i, 10j, 10k are arranged equidistantly in the direction (i.e. the X-axis direction) from the first end 11a toward the second end 11b of the pipeline 11, and the leak detection sensor 2 is correspondingly arranged in the same way as described above. In the embodiment, under the condition that the first conductive layer 21 and the second conductive layer 23 are connected to the electricity, respectively, the conducting-resistance values corresponding to the leaking liquid 9 spilled from each one of the adapters 10a, 10b, 10c, 10d, 10e, 10f, 10g, 10h, 10i, 10j is related to the distance from each one of the adapters 10a, 10b, 10c, 10d, 10e, 10f, 10g, 10h, 10i, 10j, 10k to the first end 11a. In other words, when the leak detection sensor 2 is applied to monitor a plurality of adapter-coupling positions, by utilizing the regression correction of the conducting-resistance measured, the leaking location in the adapter-coupling positions is determined. The configuration of the leak detection sensor 2 in the complicated adapter-coupling pipeline is simplified, and the leak detection applications are integrated efficiently. In the embodiment, the adapters 10a, 10b, 10c, 10d, 10e, 10f, 10g, 10h, 10i, 10j, 10k are combined with one single leak detection sensor 2 for leak detection applications. In other embodiments, the adapters 10a, 10b, 10c, 10d, 10e, 10f, 10g, 10h, 10i, 10j, 10k are divided in the form of segments to combine with a plurality of leak detection sensors 2 for leak detection applications. The present disclosure is not limited thereto. By utilizing the detection mode of conducting-resistance to replace the conventional leak detection method of detecting the inner pressure change in the pipeline, the sensitivity of the sensing element triggered by the leaking liquid is improved. In addition, the leak detection sensor 2 of the present disclosure is applicable to more complicated circuits, and allowed to be divided in the form of segments to cover all adapter-coupling positions where a leaking liquid may be generated, so as to determine the location of leakage accurately therethrough. Certainly, the present disclosure is not limited thereto.

Please refer to FIGS. 1 to 3. In the embodiment, pipeline 10 includes at least one positioning column 31 disposed adjacent to one of the first adapter 10a, the second adapter 10b and the third adapter 10c. Corresponding to the at least one positioning column 31, the first conductive layer 21 includes at least one first alignment aperture 213, the insulator 22 includes at least one second alignment aperture 223, and the second conductive layer 23 includes at least one third alignment aperture 232. The at least one first alignment aperture 213, the at least one second alignment aperture 223 and at least one third alignment aperture 232 are spatially corresponding to each other and in communication with each other. In the embodiment, the at least one positioning column 31 passes through the at least one third alignment aperture 232, the at least one second alignment aperture 223 and the at least one first alignment aperture 213 in sequence, so that the second conductive layer 23, the insulator 22 and the first conductive layer 21 are stacked on the pipeline 11. In the embodiment, the pipeline 11 further includes at least one fastening element 32 and at least one fastening aperture 111, which are spatially corresponding to each other. In addition, the first conductive layer 21 includes at least one first clamped portion 214, the insulator 22 includes at least one second clamped portion 224, and the second conductive layer 23 includes at least one third clamped portion 233. The at least one first clamped portion 214, the at least one second clamped portion 224, and the at least one third clamped portion 233 are spatially corresponding to the at least one fastening aperture 111. When the at least one fastening element 32 is engaged with the at least one fastening aperture 111, the at least one first clamped portion 214, the at least one second clamped portion 224 and the at least one third clamped portion 233 are clamped, so that the second conductive layer 23, the insulator 22 and the first conductive layer 11 are stacked and fastened on the pipeline 11. Certainly, the manner of fastening the leak detection sensor 2 on the pipeline 11 is adjustable according to the practical requirements, but the present disclosure is not limited thereto.

Figure 6:
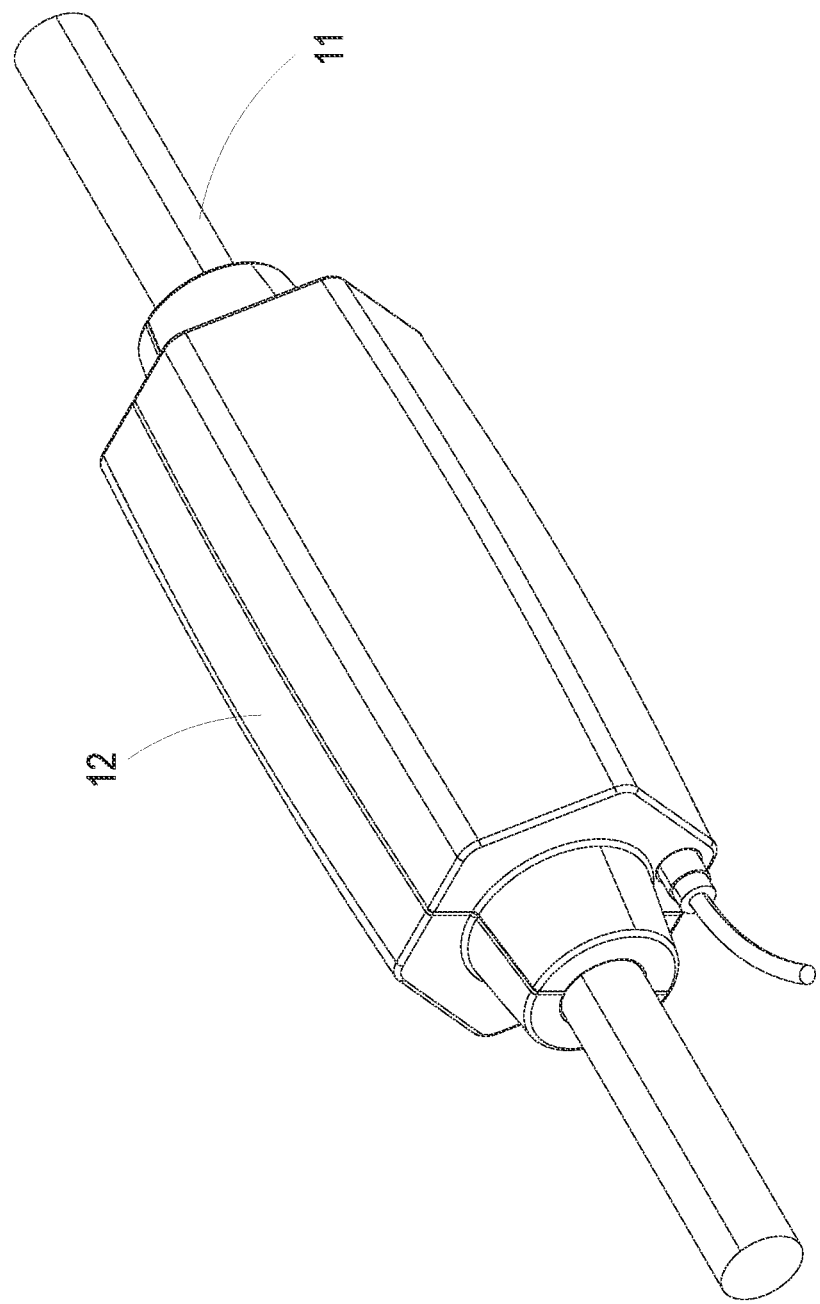
FIG. 6 is a perspective view illustrating a leak detection system according to a second embodiment of the present disclosure.
Figure 7:
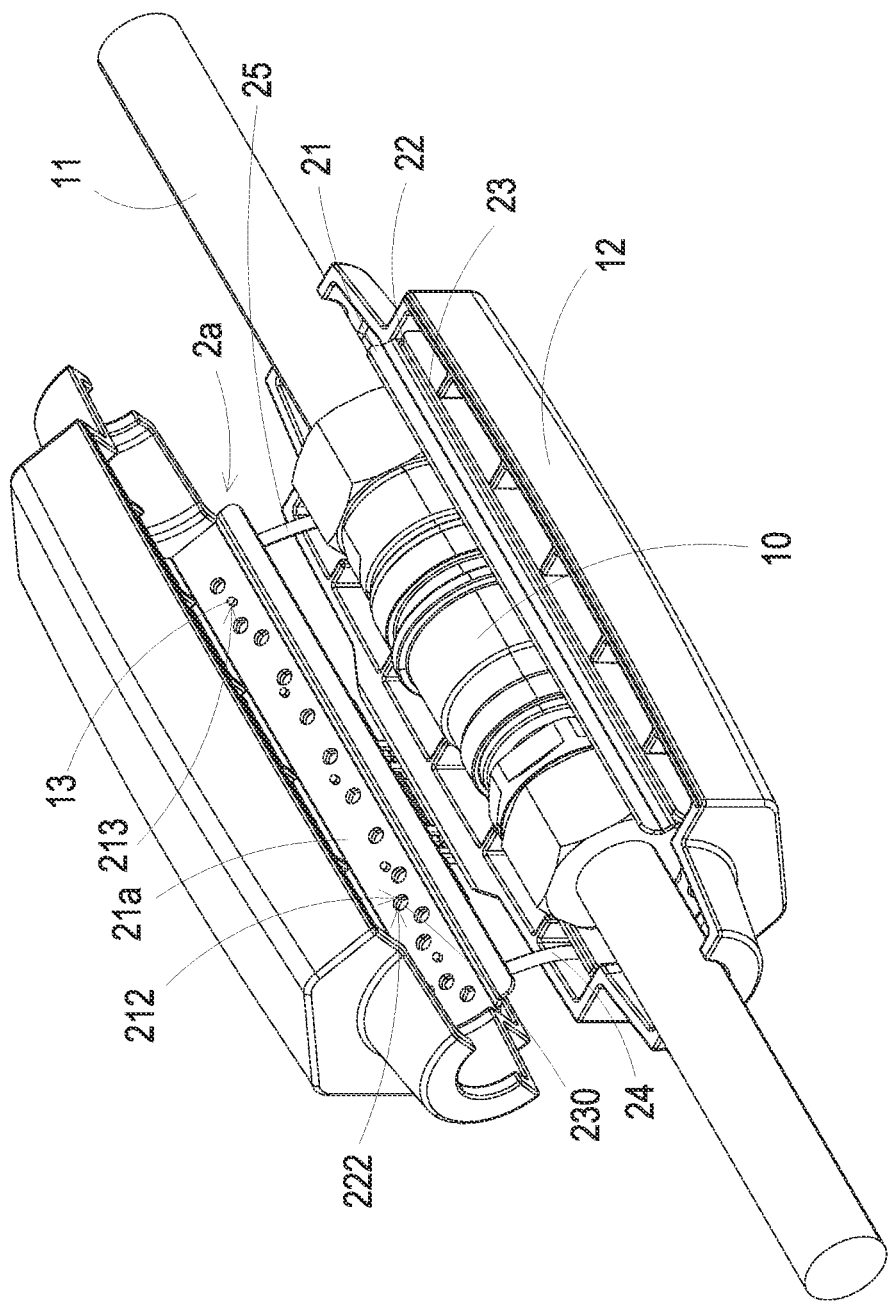
FIG. 7 is a schematic perspective view illustrating the leak detection system with the outer cover disassembled to expose the leak detection sensor according to the second embodiment of the present disclosure.
Figure 8:
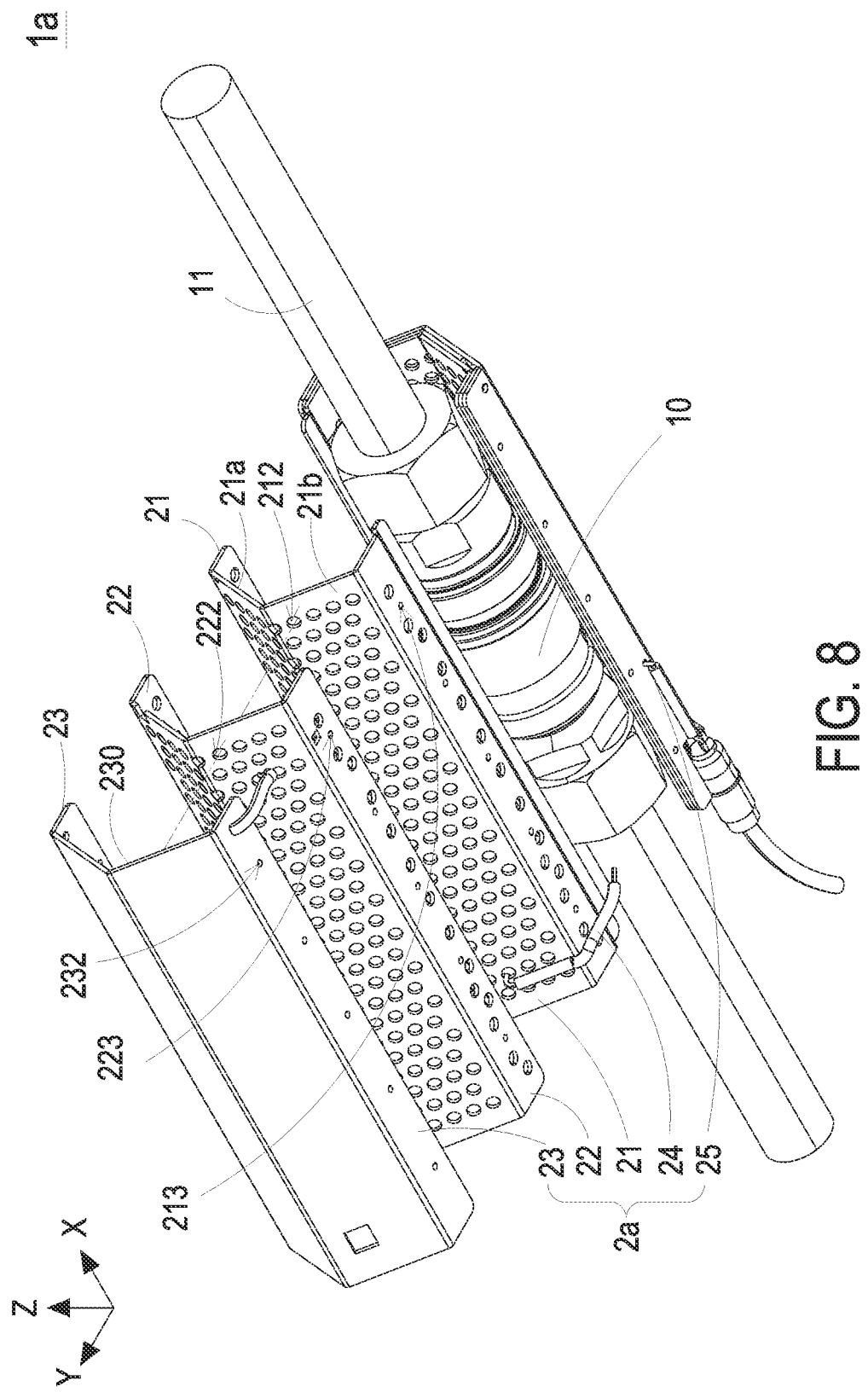
FIG. 8 is a partial exploded view illustrating the leak detection sensor in the leak detection system according to the second embodiment of the present disclosure.

FIG. 6 is a perspective view illustrating a leak detection system according to a second embodiment of the present disclosure. FIG. 7 is a schematic perspective view illustrating the leak detection system with the outer cover disassembled to expose the leak detection sensor according to the second embodiment of the present disclosure. FIG. 8 is a partial exploded view illustrating the leak detection sensor in the leak detection system according to the second embodiment of the present disclosure. In the embodiment, the structures, elements and functions of the leak detection system 1a and the leak detection sensor 2a are similar to those of the leak detection system 1 and the leak detection sensor 2 of FIGS. 1 to 5, and are not redundantly described herein. In the embodiment, the adapter 10 is led out from one end of the pipeline 11 and coupled to another pipeline. In the embodiment, the leak detection sensor 2a is also designed to have a sandwiched structure, covering the adapter-coupling position formed by the adapter 10 and the pipeline 11. The leak detection sensor 2a is disposed adjacent to the adapter-coupling position formed by the adapter 10 and the pipeline 11, and configured to detect a leaking liquid 9 (Referring to FIGS. 4A and 4B) spilled from the adapter-coupling position. In the embodiment, the leak detection sensor 2a includes a first conductive layer 21, an insulator 22 and a second conductive layer 23. The first conductive layer 21 includes a first surface 21a and a second surface 21b opposite to each other, and a plurality of first through holes 212 passed through the first surface 21a and the second surface 21b. The adapter-coupling position formed by the adapter 10 and the pipeline 11 is located outside the first surface 21a, and the plurality of first through holes 212 are disposed adjacent to the adapter-coupling position. The insulator 22 is disposed on the second surface 21b and includes a plurality of second through holes 222, which are spatially corresponding to the plurality of first through holes 212, and in fluid communication with the corresponding first through holes 21, respectively. The second conductive layer 23 is connected to the second surface 21a of the first conductive layer 21 through the insulator 22, and further includes a conducting surface 230. The conducting surface 230 is in communication with the adapter-coupling position, formed by the adapter 10 and the pipeline 11, through the corresponding second through hole 222 and the corresponding first through hole 212. In other embodiments, the conducting surface 230 is further provided with an opening (not shown) corresponding to the second through hole 222 and the first through hole 212. That is, the conducting surface 230 is further extended to an inner wall surface of the opening, and in communication with the adapter-coupling position, formed by the adapter 10 and the pipeline 11, through the corresponding second through hole 222 and the corresponding first through hole 212. Certainly, the present disclosure is not limited thereto. In the embodiment, the first conductive layer 21 and the second conductive layer 23 are insulated from each other through the insulator 22. When the leaking liquid 9 is spilled into any corresponding set of the first through hole 212 and the second through hole 222 in fluid communication with each other, and in contact with the conducting surface 230, the second conductive layer 23 is conducted to the first conductive layer 21 to form a conducting-resistance value to realize the leak detection.

Preferably but not exclusively, in the embodiment, the leak detection sensor 2a includes two sets of sandwiched structures to cover the adapter-coupling position formed by the adapter 10 and the pipeline 11. In an embodiment, the leak detection sensor 2a is disposed adjacent to the adapter-coupling position formed by the adapter 10 and the pipeline 11 in a single sandwiched structure. In another embodiment, the leak detection sensor 2a includes a plurality of sandwiched structures to cover the adapter-coupling position formed by the adapter 10 and the pipeline 11. In other embodiments, the number and the combination type of the leak detection sensors 2a are adjustable according to the practical requirements. Certainly, the present disclosure is not limited thereto. In the embodiment, the leak detection sensor 2a includes a first wire 24, a second wire 25 and a sensing element (not shown). The sensing element is electrically connected to the first conductive layer 21 and the second conductive layer 23 through the first wire 24 and the second wire 25, respectively. The first conductive layer 21 and the second conductive layer 23 are connected to the electricity, respectively. Preferably but not exclusively, the first conductive layer 21 and the second conductive layer 23 are electrically connected to different potentials, respectively. That is, there is a potential difference between the first conductive layer 21 and the second conductive layer 23, so as to realize the leak detection of the leaking liquid 9. In the embodiment, the leak detection range of the leak detection sensor 2a is small. When the leaking liquid 9 is spilled into any corresponding set of the first through hole 212 and the second through hole 222 and in contact with the conducting surface 230, the second conductive layer 23 is conducted to the first conductive layer 21. In other embodiments, the number, the size and the corresponding arrangement of the first through holes 212 and the second through holes 222 are adjustable according to the practical requirements, and the present disclosure is not limited thereto.

On the other hand, in the embodiment, the leak detection system 1a further includes an outer sleeve 12, which is detachably disposed on the pipeline 11, and covers the leak detection sensor 2a and at least one adapter 10. In an embodiment, the adapter-coupling position formed by the adapter 10 and the pipeline 11 is covered by the leak detection sensor 2a, and then the leak detection sensor 2a is covered by the outer sleeve 12 in a clip-on manner, so that the leak detection sensor 2a is attached to the outer periphery of the adapter 10 firmly to realizes the leak detection at the adapter-coupling position formed by the adapter 10 and the pipeline 11. By covering the leak detection sensor 2a with the outer sleeve 12, a basic protection function is provided, and it also prevents the leak detection sensor 2a from being affected by external factors. Even a small amount of leakage, it allows the leak detection sensor 2a to be triggered for the leak detection immediately. In the embodiment, the outer sleeve 12 further includes at least one positioning column 13 disposed on an inner wall surface of the outer sleeve 12. Corresponding to the at least one positioning column 13 on the outer sleeve 12, the first conductive layer 21 includes at least one first alignment aperture 213, the insulator 22 includes at least one second alignment aperture 223, and the second conductive layer 23 includes at least one third alignment aperture 232. The at least one first alignment aperture 213, the at least one second alignment aperture 223 and the at least one third alignment aperture 232 are spatially corresponding to each other and in communication with each other. The at least one positioning column 13 passes through the third alignment aperture 232, the at least one second alignment aperture 223 and the at least one first alignment aperture 213 in sequence. In other words, when the outer sleeve 12 covers the leak detection sensor 2a and the at least one adapter 10, the at least one positioning column 13 passes through the corresponding set of the at least one third alignment aperture 232 and the at least one second alignment aperture 223 and the at least one first alignment aperture 213 in sequence, so that the leak detection sensor 2a is firmly fixed in the outer sleeve 12. During installation, the second conductive layer 23, the insulator 22 and the first conductive layer 21 are fastened on the inner wall surface of the outer sleeve 12 firmly with the at least one positioning column 13 passing through the corresponding set of the at least one third alignment aperture 232, the second alignment aperture 223 and the first alignment aperture 213 in sequence, and then the first surface 21a of the first conductive layer 21 is attached to the adapter 10 through a snap spring of the outer sleeve 12. The outer sleeve 12 and the leak detection sensor 2a are fastened and covering on the outer periphery of the adapter 10, and the leak detection of the adapter-coupling position formed by the adapter 10 and the pipeline 11 is realized. Certainly, the manner of covering the leak detection sensor 2a and the adapter 10 through the outer sleeve 12 is not limited thereto, and not redundantly described herein.

From the foregoing descriptions, it is known that the sandwiched structure designed in the leak detection sensor 2 and the leak detection sensor 2a is applicable in a wide range. According to the different environments of the adapter-coupling positions, the leak detection sensor 2 and the leak detection sensor 2a can be laid on a flat surface or set in a double clamp arrangement. Certainly, the leak detection system 1, 1a and the leak detection sensor 2, 2a are adjustable according to the actual application requirements. The present disclosure is not limited thereto, and not redundantly described hereafter.

In summary, the present disclosure provides a leak detection sensor and a leak detection system using the same. By utilizing a detection mode of conducting-resistance to realize the leak detection of a leaking liquid, the conventional leak detection method of detecting the inner pressure change in the pipeline is replaced. The sensitivity of the sensing element triggered by the leaking liquid is improved. In addition, the leak detection sensor and the leak detection system are applicable to more complicated circuits, and divided in the form of segments to cover a plurality of adapter-coupling positions where a leaking liquid may be generated. When any one of the segments detects the leaking liquid, it is determined accurately therethrough. On the other hand, the leak detection sensor is designed with a sandwiched structure, which includes an upper conductive layer and a lower conductive layer disposed on top and bottom, respectively, and a middle insulator disposed in the middle. The upper conductive layer and the lower conductive layer are connected to the electricity, respectively. Since each of the upper conductive layer and the middle insulator is designed to include a plurality of through holes, the leaking liquid is allowed to flow to the lower conductive layer. When the leaking liquid is passed through the through holes, a conducting-resistance is formed between the upper conductive layer and the lower conductive layer, and the sensing element is triggered. Compared with the conventional leak detection method of detecting the inner pressure change in the pipeline, the leak detection sensor of the present disclosure has a sensitive sensing ability. When there is a leaking liquid generated even with a small amount of leakage, the sensing element is triggered for the leak detection immediately. The location of leakage is found for performing the follow-up treatments. It prevents a large amount of leaking liquid from generating and causing personal injury or property loss. In addition, the design of the sandwiched structure is applicable in a wide range. According to the different environments of the adapter-coupling positions, the leak detection sensor is laid on a flat surface or set in a double clamp arrangement. When the leak detection sensor is applied to monitor a plurality of adapter-coupling positions, by utilizing the regression correction of the conducting-resistance measured, the leaking location in the adapter-coupling positions is determined. The configuration of the leak detection sensor in the complicated adapter-coupling pipeline is simplified, and the leak detection applications are integrated efficiently.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A leak detection system comprising:
   at least one adapter connected to a pipeline to form at least one adapter-coupling position; and
   a leak detection sensor disposed adjacent to the at least one adapter-coupling position for detecting a leaking liquid spilled from the at least one adapter-coupling position, wherein the leak detection sensor comprises:
   a first conductive layer comprising a first surface, a second surface and at least one first through hole, wherein the first surface and the second surface are opposite to each other, and the at least one first through hole is passed through the first surface and the second surface, wherein the at least one adapter-coupling position is located outside the first surface and the at least one first through hole is disposed adjacent to the at least one adapter-coupling position;
   an insulator disposed on the second surface and comprising at least one second through hole, wherein the at least one first through hole and the at least one second through hole are in fluid communication with each other; and
   a second conductive layer connected to the second surface of the first conductive layer through the insulator, and comprising at least one conducting surface in fluid communication with the at least one adapter-coupling position through the at least one second through hole and the at least one first through hole;
   wherein the first conductive layer and the second conductive layer are insulated from each other through the insulator, wherein when the leaking liquid is spilled into the at least one first through hole and the at least one second through hole, and in contact with the at least one conducting surface, the second conductive layer is conducted to the first conductive layer to form a conducting-resistance value, wherein the pipeline comprises at least one positioning column disposed adjacent to the at least one adapter, wherein the first conductive layer comprises at least one first alignment aperture, the insulator comprises at least one second alignment aperture, and the second conductive layer comprises at least one third alignment aperture, wherein the at least one first alignment aperture, the at least one second alignment aperture, and the at least one third alignment aperture are spatially corresponding to each other and in communication with each other, wherein the at least one positioning column passes through the at least one third alignment aperture, the at least one second alignment aperture and the at least one first alignment aperture in sequence, so that the second conductive layer, the insulator layer and the first conductive layer are stacked on the pipeline.

2. The leak detection system according to claim 1, wherein the leak detection sensor is disposed along the pipeline and attached to an outer periphery of the pipeline, and the at least one adapter is led out from the outer periphery of the pipeline.

3. The leak detection system according to claim 1, wherein the first conductive layer comprises at least one first opening, the insulator comprises at least one second opening, and the second conductive layer comprises at least one third opening, wherein the at least one first opening, the at least one second opening and the at least one third opening are spatially corresponding to the at least one adapter, and the at least one adapter passes through the at least one third opening, the at least one second opening and the at least one first opening in sequence, so that the at least one adapter-coupling position is located outside the first surface, and the at least one first through hole and the at least one adapter-coupling position are disposed adjacent to each other.

4. The leak detection system according to claim 3, wherein the pipeline comprises at least one fastening element and at least one fastening aperture spatially corresponding to each other, wherein the first conductive layer comprises at least one first clamped portion, the insulator comprises at least one second clamped portion, and the third conductive layer comprises at least one third clamped portion, and the at least one first clamped portion, the at least one second clamped portion and the at least one third clamped portion are spatially corresponding to the at least one fastening aperture, wherein when the at least one fastening element is engaged with the at least one fastening aperture, the at least one first clamped portion, the at least one second clamped portion and the at least one third clamped portion are clamped, so that the second conductive layer, the insulator and the first conductive layer are stacked and fastened on the pipeline.

5. The leak detection system according to claim 1, wherein the pipeline is extended along a direction and has a first end and a second end opposite to each other, wherein the leak detection sensor further comprises a first wire and a second wire disposed on the first end of the pipeline, and electrically connected to the first conductive layer and the second conductive layer, respectively.

6. The leak detection system according to claim 5, wherein the at least one adapter comprises a first adapter and a second adapter disposed along the direction, wherein the distance from the second adapter to the first end is greater than the distance from the first adapter to the first end, and the conducting-resistance value corresponding to the leaking liquid spilled from the second adapter is greater than the conducing-resistance value corresponding to the leaking liquid spilled from the first adapter.

7. The leak detection system according to claim 1, wherein the first surface of the first conductive layer covers the at least one adapter-coupling position, the insulator covers the second surface of the first conductive layer, and the second conductive layer covers the insulator.

8. The leak detection system according to claim 1, wherein the leak detection sensor further comprises a sensing element electrically connected to the first conductive layer and the second conductive layer, respectively, wherein when the leaking liquid is spilled into the at least one first through hole and the at least one second through hole, and in contact with the at least one conducting surface, the conducting-resistance value is measured by the sensing element.

9. The leak detection system according to claim 1, wherein the first conductive layer and the second conductive layer are electrically connected to different potentials, respectively.

* * * * *